US012754393B2

(12) United States Patent
Lee

(10) Patent No.: US 12,754,393 B2
(45) Date of Patent: Oct. 6, 2026

(54) LENS ASSEMBLY

(71) Applicants: Sintai Optical (Shenzhen) Co., Ltd., ShenZhen City (CN); Asia Optical Co., Inc., Taichung (TW)

(72) Inventor: Jian-Wei Lee, Taichung (TW)

(73) Assignees: SINTAI OPTICAL (SHENZHEN) CO., LTD., Shenzhen City (CN); ASIA OPTICAL CO., INC., Taichung (TW)

(*) Notice: Subject to any disclaimer, the term of this patent is extended or adjusted under 35 U.S.C. 154(b) by 169 days.

(21) Appl. No.: 18/675,422

(22) Filed: May 28, 2024

(65) Prior Publication Data

US 2024/0402462 A1 Dec. 5, 2024

(30) Foreign Application Priority Data

May 31, 2023 (TW) ................................ 112120322

(51) Int. Cl.
*G02B 9/34* (2006.01)
*G02B 3/00* (2006.01)

(52) U.S. Cl.
CPC ................. *G02B 9/34* (2013.01); *G02B 3/00* (2013.01); *G02B 2003/0093* (2013.01)

(58) Field of Classification Search
CPC ..... G02B 9/34; G02B 3/00; G02B 2003/0093
USPC ........................................................ 359/771
See application file for complete search history.

(56) References Cited

U.S. PATENT DOCUMENTS

| | | | |
|---|---|---|---|
| 9,354,425 B2 | 5/2016 | Lin et al. | |
| 11,327,277 B2 | 5/2022 | Hsueh et al. | |
| 2015/0253542 A1* | 9/2015 | Lin | G02B 13/06 348/148 |

FOREIGN PATENT DOCUMENTS

| | | |
|---|---|---|
| CN | 107167901 A | 9/2017 |
| CN | 107436478 A | 12/2017 |
| CN | 114089507 B | 5/2022 |
| TW | I487943 B | 6/2015 |
| TW | I730517 B | 6/2021 |

* cited by examiner

*Primary Examiner* — Bumsuk Won
*Assistant Examiner* — Mitchell T Oestreich
(74) *Attorney, Agent, or Firm* — McClure, Qualey & Rodack, LLP

(57) ABSTRACT

A lens assembly includes a first lens, a second lens, a third lens, and a fourth lens. The first lens is with negative refractive power. The second lens is with positive refractive power. The third lens is with refractive power. The fourth lens is with refractive power. The first lens, the second lens, the third lens, and the fourth lens are arranged in order from an object side to an image side along an optical axis. The lens assembly satisfies at least one of the following conditions: 3≤f3/f≤5.5; 0.2≤f/AAG≤0.3; 0.72≤f/BFL≤1.04.

20 Claims, 15 Drawing Sheets

LENS ASSEMBLY

CROSS REFERENCE TO RELATED APPLICATIONS

This application claims the right of priority under 35 U.S.C. § 119 of Taiwan Patent Application TW112120322 filed on May 31, 2023, which is incorporated by reference herein in its entirety.

BACKGROUND OF THE INVENTION

Field of the Invention

The present invention relates to a lens assembly.

Description of the Related Art

The current development trend of a lens assembly used in Time of Flight (ToF) is toward miniaturization. Additionally, the lens assembly is developed to have large field of view, small F-number, and high resolution in accordance with different ToF application requirements. However, the known lens assembly can't satisfy. Therefore, the lens assembly needs a new structure in order to meet the requirements of miniaturization, large field of view, small F-number, and high resolution at the same time.

BRIEF SUMMARY OF THE INVENTION

The invention provides a lens assembly to solve the above problems. The lens assembly of the invention is provided with characteristics of a shortened total lens length, an increased field of view, a decreased F-number, an increased resolution, and still has a good optical performance.

The lens assembly in accordance with an exemplary embodiment of the invention includes a first lens, a second lens, a third lens, and a fourth lens. The first lens has negative refractive power. The second lens has positive refractive power. The third lens has refractive power. The fourth lens has refractive power. The first lens, the second lens, the third lens, and the fourth lens are arranged in order from the object side to the image side along an optical axis. The lens assembly satisfies at least one of the following conditions: $3 \le f3/f \le 5.5$; $0.2 \le f/AAG \le 0.3$; $0.72 \le f/BFL \le 1.04$; wherein f is an effective focal length of the lens assembly, f3 is an effective focal length of the third lens, AAG is a sum of all air intervals from an image side surface of the first lens to an object side surface of the fourth lens along the optical axis, and BFL is an interval from an image side surface of the fourth lens to an image plane along the optical axis. When the lens assembly of the present invention meets the above characteristics and at least one of the conditions without requiring other additional characteristics or conditions, the basic functions of the lens assembly of the present invention can be achieved.

In another exemplary embodiment, the third lens is with positive refractive power.

In yet another exemplary embodiment, the third lens includes a convex surface facing the object side.

In another exemplary embodiment, the third lens includes a convex surface facing the image side.

In yet another exemplary embodiment, the lens assembly satisfies at least one of the following conditions: $3 \le f4/f \le 9.5$; $5.5 \le TTL/BFL \le 8.5$; $2.3 \le TTL/T1 \le 2.65$; wherein f is the effective focal length of the lens assembly, f4 is an effective focal length of the fourth lens, TTL is an interval from an object side surface of the first lens to the image plane along the optical axis, BFL is the interval from the image side surface of the fourth lens to the image plane along the optical axis, and T1 is an interval from the image side surface of the first lens to an object side surface of the second lens along the optical axis.

In another exemplary embodiment, the third lens includes a concave surface facing the image side.

In yet another exemplary embodiment, the first lens is a spherical glass lens, the second lens is a spherical glass lens, the third lens is a spherical glass lens, or the fourth lens is an aspheric plastic lens.

In another exemplary embodiment, the lens assembly further includes a stop disposed between the second lens and the third lens, wherein: the first lens is a meniscus lens and includes a convex surface facing the object side and a concave surface facing the image side, the second lens is a meniscus lens and includes a convex surface facing the object side and a concave surface facing the image side, the third lens is a biconvex lens with positive refractive power and includes a convex surface facing the object side and another convex surface facing the image side, the fourth lens is a meniscus lens with positive refractive power and includes a convex surface facing the object side and a concave surface facing the image side.

In yet another exemplary embodiment, the lens assembly further includes a stop disposed between the second lens and the third lens, wherein: the first lens is a meniscus lens and includes a convex surface facing the object side and a concave surface facing the image side, the second lens is a meniscus lens and includes a convex surface facing the object side and a concave surface facing the image side, the third lens is a meniscus lens with positive refractive power and includes a convex surface facing the object side and a concave surface facing the image side, the fourth lens is a meniscus lens with positive refractive power and includes a convex surface facing the object side and a concave surface facing the image side.

In another exemplary embodiment, the fourth lens is with positive refractive power.

In yet another exemplary embodiment, the fourth lens is a meniscus lens and includes a convex surface facing the object side and a concave surface facing the image side.

In another exemplary embodiment, the first lens is a meniscus lens and includes a convex surface facing the object side and a concave surface facing the image side, the second lens is a meniscus lens and includes a convex surface facing the object side and a concave surface facing the image side.

In yet another exemplary embodiment, the lens assembly further includes a stop disposed between the second lens and the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
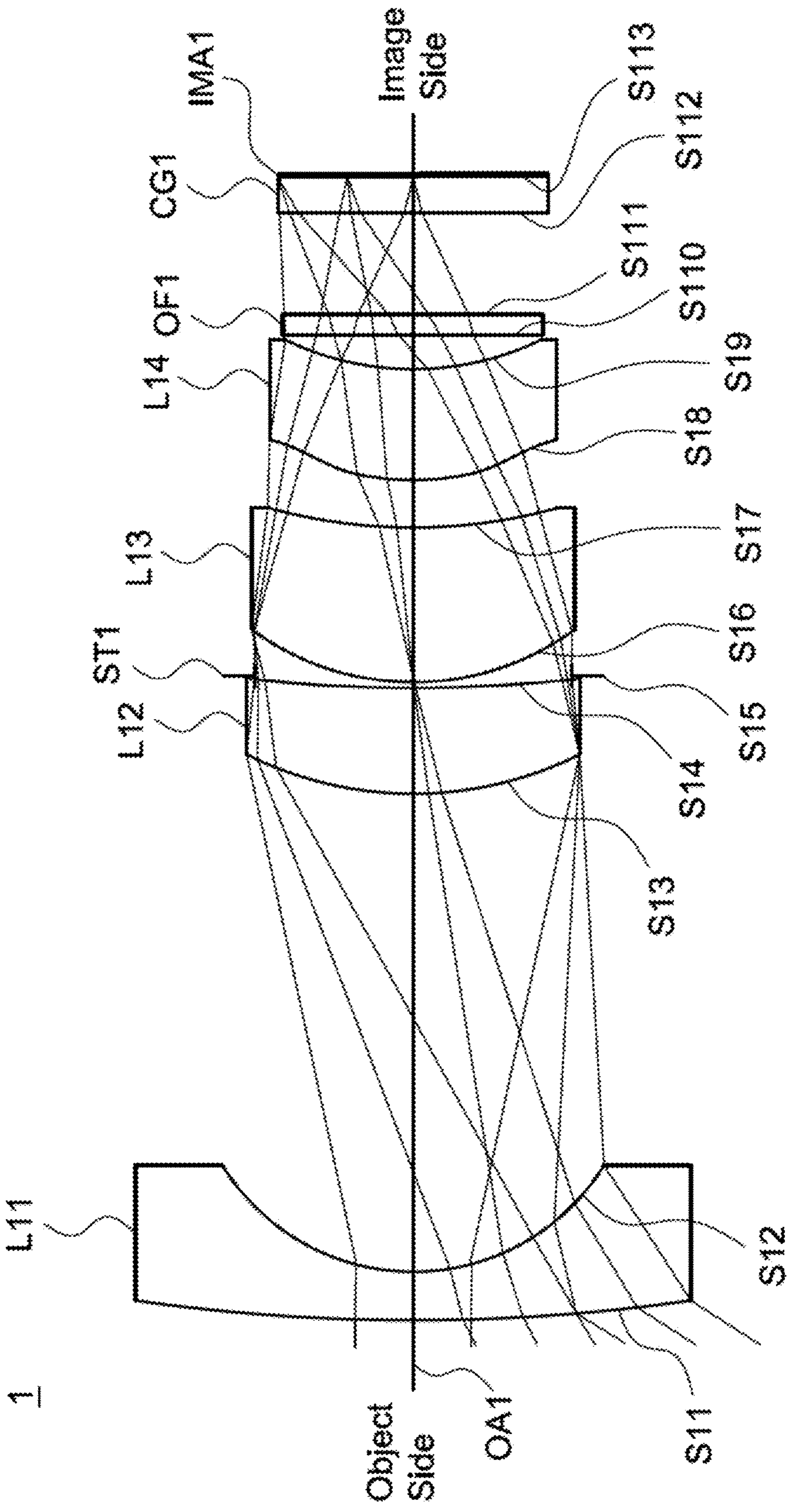
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, and a fourth lens. The first lens having negative refractive power. The second lens having positive refractive power. The third lens having refractive power. The fourth lens having refractive power. The first lens, the second lens, the third lens, and the fourth lens are arranged in order from the object side to the image side along an optical axis. The lens assembly satisfies at least one of the following conditions: $3 \le f3/f \le 5.5$; $0.2 \le f/AAG \le 0.3$; $0.72 \le f/BFL \le 1.04$; wherein f is an effective focal length of the lens assembly, f3 is an effective focal length of the third lens, AAG is a sum of all air intervals from an image side surface of the first lens to an object side surface of the fourth lens along the optical axis, and BFL is an interval from an image side surface of the fourth lens to an image plane along the optical axis. A lens assembly of the present invention is a preferred embodiment of the present invention when the lens assembly satisfies the above features and at least one of the above conditions.

Referring to Table 1, Table 2, Table 4, Table 5, Table 7, Table 8, Table 10, Table 11, Table 13, Table 14, Table 16, and Table 17, wherein Table 1, Table 4, Table 7, Table 10, Table 13, and Table 16 show optical specification in accordance with a first, second, third, fourth, fifth, and sixth embodiments of the invention, respectively and Table 2, Table 5, Table 8, Table 11, Table 14, and Table 17 show aspheric coefficients of each aspheric lens in Table 1, Table 4, Table 7, Table 10, Table 13, and Table 16, respectively. The aspheric surface sag z of each aspheric lens in the following embodiments can be calculated by the following formula: $z=ch^2/\{1+[1-(k+1)c^2h^2]^{1/2}\}+Ah^4+Bh^6+Ch^8+Dh^{10}+Eh^{12}+Fh^{14}+Gh^{16}$, where c is curvature, h is the vertical distance from the lens surface to the optical axis, k is conic constant, A, B, C, D, E, F, and G are aspheric coefficients, and the value of the aspheric coefficient A, B, C, D, E, F, and G are presented in scientific notation, such as 2E-03 for $2\times10^{-3}$.

FIGS. 1, 5, 9, 13, 14, and 15 are lens layout diagrams of the lens assemblies in accordance with the first, second, third, fourth, fifth, and sixth embodiments of the invention, respectively.

The first lenses L11, L21, L31, L41, L51, and L61 are meniscus lenses with negative refractive power and made of glass material, wherein the object side surfaces S11, S21, S31, S41, S51, and S61 are convex surfaces, the image side surfaces S12, S22, S32, S42, S52, and S62 are concave surfaces, and both of the object side surfaces S11, S21, S31, S41, S51, S61 and the image side surfaces S12, S22, S32, S42, S52, S62 are spherical surfaces.

The second lenses L12, L22, L32, L42, L52, and L62 are meniscus lenses with positive refractive power and made of glass material, wherein the object side surfaces S13, S23, S33, S43, S53, and S63 are convex surfaces, the image side surfaces S14, S24, S34, S44, S54, and S64 are concave surfaces, and both of the object side surfaces S13, S23, S33, S43, S53, S63 and the image side surfaces S14, S24, S34, S44, S54, S64 are spherical surfaces.

The third lenses L13, L23, L33, L43, L53, and L63 are with positive refractive power and made of glass material, wherein the object side surfaces S16, S26, S36, S46, S56, and S66 are convex surfaces, and both of the object side surfaces S16, S26, S36, S46, S56, S66 and the image side surfaces S17, S27, S37, S47, S57, S67 are spherical surfaces.

The fourth lenses L14, L24, L34, L44, L54, and L64 are meniscus lenses with positive refractive power and made of plastic material, wherein the object side surfaces S18, S28, S38, S48, S58, and S68 are convex surfaces, the image side surfaces S19, S29, S39, S49, S59, and S69 are concave surfaces, and both of the object side surfaces S18, S28, S38, S48, S58, S68 and the image side surfaces S19, S29, S39, S49, S59, S69 are aspheric surfaces.

In addition, the lens assemblies 1, 2, 3, 4, 5, and 6 satisfy at least one of the following conditions (1)-(6):

$$5.5 \le TTL/BFL \le 8.5; \quad (1)$$

$$3 \le f3/f \le 5.5; \quad (2)$$

$$3 \le f4/f \le 9.5; \quad (3)$$

$$2.3 \le TTL/T1 \le 2.65; \quad (4)$$

$$0.2 \le f/AAG \le 0.3; \quad (5)$$

$$0.72 \le f/BFL \le 1.04; \quad (6)$$

wherein: f is an effective focal length of the lens assemblies 1, 2, 3, 4, 5, 6 for the first to sixth embodiments, f3 is an effective focal length of the third lenses L13, L23, L33, L43, L53, L63 for the first to sixth embodiments, f4 is an effective focal length of the fourth lenses L14, L24, L34, L44, L54, L64 for the first to sixth embodiments, AAG is a sum of all air intervals from an image side surfaces S12, S22, S32, S42, S52, S62 of the first lenses L11, L21, L31, L41, L51, L61 to an object side surfaces S18, S28, S38, S48, S58, S68 of the fourth lenses L14, L24, L34, L44, L54, L64 along the optical axes OA1, OA2, OA3, OA4, OA5, OA6 respectively for the first to sixth embodiments, BFL is an interval from the image side surfaces S19, S29, S39, S49, S59, S69 of the fourth lenses L14, L24, L34, L44, L54, L64 to the image planes IMA1, IMA2, IMA3, IMA4, IMA5, IMA6 along the optical axes OA1, OA2, OA3, OA4, OA5, OA6 for the first to sixth embodiments, TTL is an interval from the object side surfaces S11, S21, S31, S41, S51, S61 of the first lenses L11, L21, L31, L41, L51, L61 to the image planes IMA1, IMA2, IMA3, IMA4, IMA5, IMA6 along the optical axes OA1, OA2, OA3, OA4, OA5, OA6 for the first to sixth embodiments, and T1 is an air interval from the image side surfaces S12, S22, S32, S42, S52, S62 of the first lenses L11, L21, L31, L41, L51, L61 to the object side surfaces S13, S23, S33, S43, S53, S63 of the second lenses L12, L22, L32, L42, L52, L62 along the optical axes OA1, OA2, OA3, OA4, OA5, OA6 for the first to sixth embodiments. With the lens assemblies 1, 2, 3, 4, 5, 6 satisfying at least one of the above conditions (1)-(6), the total lens length can be effectively shortened, the resolution can be effectively increased, and the aberration can be effectively corrected.

When the condition (1): 5.5≤TTL/BFL≤8.5 is satisfied, the total lens length of the lens assembly can be effectively shortened and a more suitable back focal length can be achieved. When the condition (2): 3≤f3/f≤5.5 is satisfied, the distortion caused by the negative refractive power of the first lens can be effectively reduced. When the condition (3): 3≤f4/f≤9.5 is satisfied, the chief ray angle can be effectively controlled to obtain better imaging quality. When the condition (5): 0.2≤f/AAG≤0.3 is satisfied, the total lens length of the lens assembly can be effectively shortened and the total air interval from the first lens to the fourth lens can be controlled to reduce the impact of spacer manufacturing errors on imaging quality. When the condition (6): 0.72≤f/BFL≤1.04 is satisfied, a more appropriate back focal length can be effectively achieved, which is beneficial to the assembly and manufacturing of lens assembly. When both conditions (5): 0.2≤f/AAG≤0.3 and (6): 0.72≤f/BFL≤1.04 are satisfied, the total lens length of the lens assembly can be effectively shortened and the production yield of the lens assembly can be improved. The optical path can be effectively adjusted so that it is not easy to have a big turn when the first lens has negative refractive power and is a meniscus lens. The spherical aberration caused by the first lens having negative refractive power can be effectively balanced when the second lens has positive refractive power and is a meniscus lens. The total lens length can be effectively decreased when the third lens has positive refractive power. The incident angle of chief ray can be adjusted significantly and the back focal length can be effectively increased, thereby facilitating the assembly of the lens assembly when the fourth lens is an aspheric lens with positive refractive power.

A detailed description of a lens assembly in accordance with a first embodiment of the invention is as follows. Referring to FIG. 1, the lens assembly 1 includes a first lens L11, a second lens L12, a stop ST1, a third lens L13, a fourth lens L14, an optical filter OF1, and a cover glass CG1, all of which are arranged in order from an object side to an image side along an optical axis OA1. In operation, the light from the object side is imaged on an image plane IMA1.

According to the foregoing, wherein: the third lens L13 is a meniscus lens, wherein the image side surface S17 is a concave surface; both of object side surface S110 and image side surface S111 of the optical filter OF1 are plane surfaces; and both of the object side surface S112 and image side surface S113 of the cover glass CG1 are plane surfaces.

With the above design of the lenses, stop ST1, and at least one of the conditions (1)-(6) satisfied, the lens assembly 1 can have an effective shortened total lens length, an effective increased resolution, and an effective corrected aberration.

Table 1 shows the optical specification of the lens assembly 1 in FIG. 1.

TABLE 1

Effective Focal Length = 2.08 mm F-number = 1.20
Total Lens Length = 17.00 mm Field of View = 115.00 degrees

| Surface Number | Radius of Curvature (mm) | Thickness (mm) | Nd | Vd | Effective Focal Length (mm) | Remark |
|---|---|---|---|---|---|---|
| S11 | 28.53 | 0.75 | 1.9 | 31.32 | −4.439 | L11 |
| S12 | 3.39 | 7.11 | | | | |
| S13 | 5.57 | 1.54 | 1.65 | 33.84 | 11.918 | L12 |
| S14 | 19.31 | 0.19 | | | | |
| S15 | ∞ | −0.09 | | | | ST1 |
| S16 | 4.01 | 2.31 | 1.62 | 60.34 | 10.791 | L13 |
| S17 | 8.02 | 0.68 | | | | |
| S18 | 2.97 | 1.69 | 1.65 | 21.51 | 7.753 | L14 |
| S19 | 5.99 | 0.48 | | | | |
| S110 | ∞ | 0.30 | 1.52 | 64.17 | | OF1 |
| S111 | ∞ | 1.53 | | | | |
| S112 | ∞ | 0.50 | 1.52 | 64.17 | | CG1 |
| S113 | ∞ | 0.01 | | | | |

In the first embodiment, the conic constant k and the aspheric coefficients A, B, C, D, E, F, G of each aspheric lens are shown in Table 2.

TABLE 2

| Surface Number | k | A | B | C | D | E | F | G |
|---|---|---|---|---|---|---|---|---|
| S18 | −0.3047 | −0.0021 | −0.0035 | 0.0029 | −0.0016 | 0.0004 | −6.7E−05 | 4.09E−06 |
| S19 | −18.3201 | 0.0284 | −0.0109 | 0.0088 | −0.0053 | 0.0018 | −0.0003 | 2.53E−05 |

Table 3 shows the parameters and condition values for conditions (1)-(6) in accordance with the first embodiment of the invention. It can be seen from Table 3 that the lens assembly 1 of the first embodiment satisfies the conditions (1)-(6).

TABLE 3

| AAG | 7.89 mm | BFL | 2.82 mm | T1 | 7.11 mm |
|---|---|---|---|---|---|
| TTL/BFL | 6.04 | f3/f | 5.19 | f4/f | 3.73 |
| TTL/T1 | 2.39 | f/AAG | 0.26 | f/BFL | 0.74 |

Figure 2:
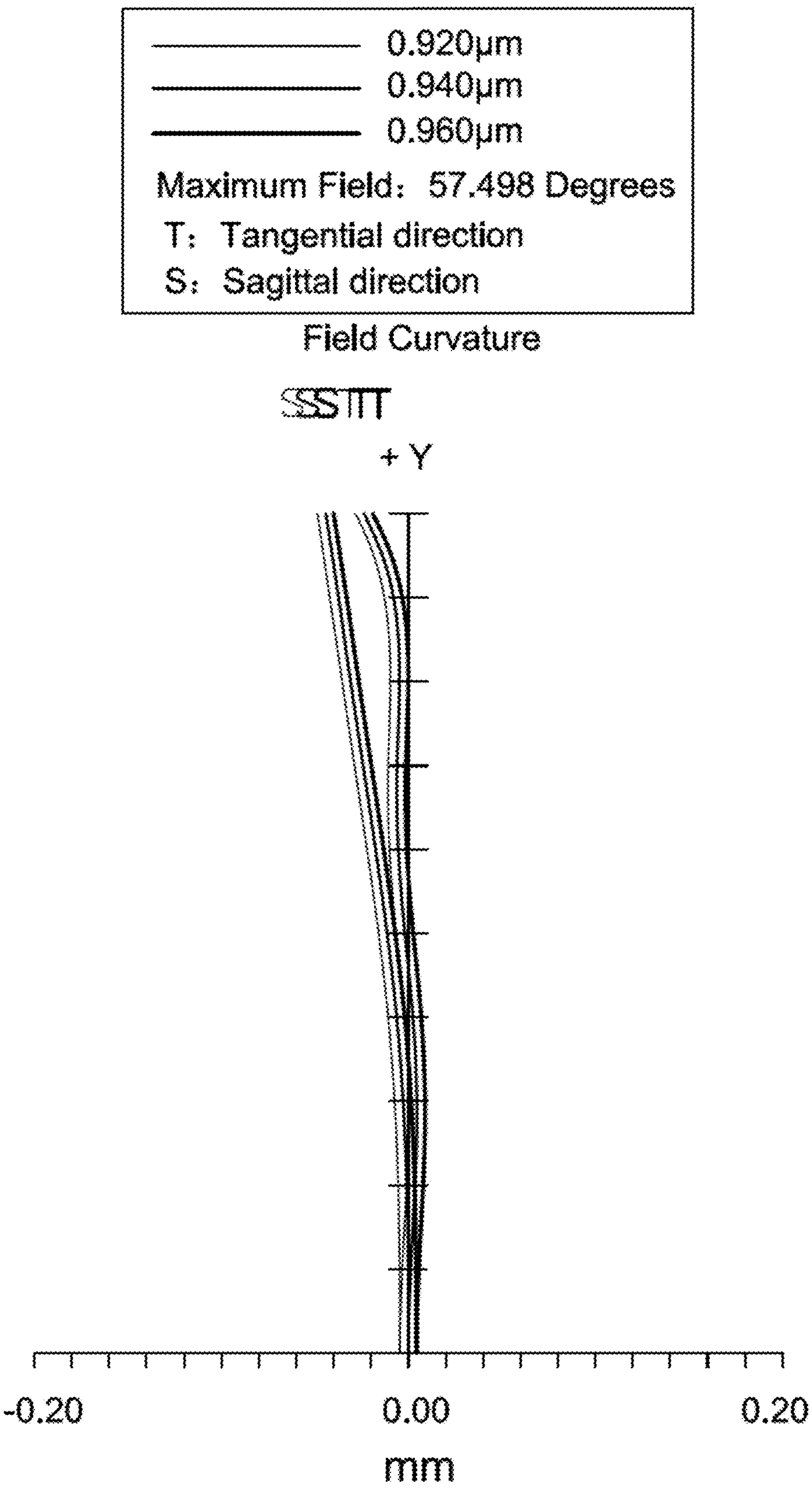
FIGS. 2, 3, and 4 depict a field curvature diagram, a distortion diagram, and a spot diagram of the lens assembly in accordance with the first embodiment of the invention, respectively.
Figure 3:
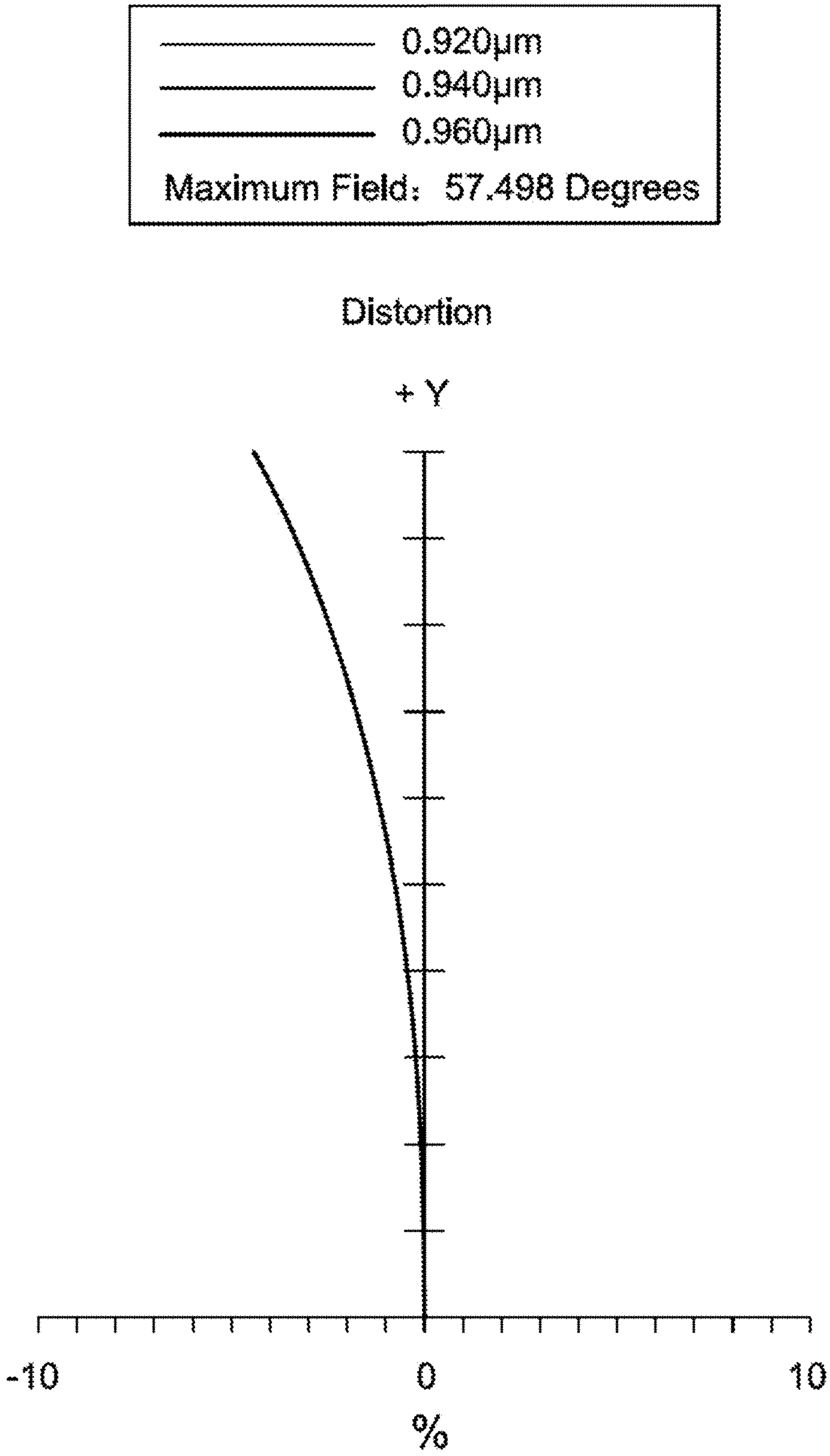
Figure 4:
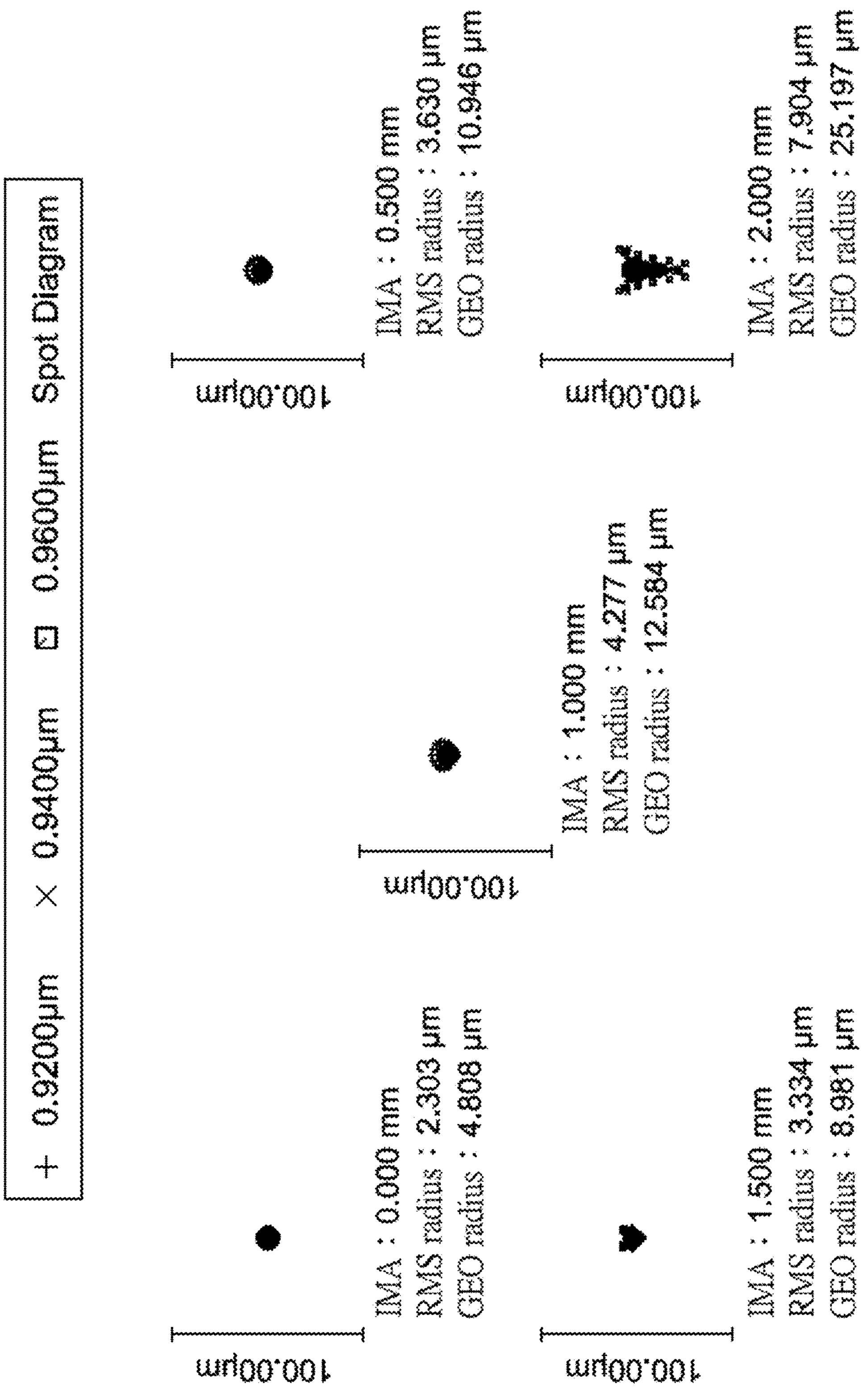

In addition, the lens assembly 1 of the first embodiment can meet the requirements of optical performance as seen in FIGS. 2-4. It can be seen from FIG. 2 that the field curvature of tangential direction and sagittal direction in the lens assembly 1 of the first embodiment ranges from −0.06 mm to 0.01 mm. It can be seen from FIG. 3 that the distortion in the lens assembly 1 of the first embodiment ranges from −5% to 0%. It can be seen from FIG. 4 that the root mean square spot radius is equal to 2.303 μm and geometrical spot radius is equal to 4.808 μm as image height is equal to 0.000 mm, the root mean square spot radius is equal to 3.630 μm and geometrical spot radius is equal to 10.946 μm as image height is equal to 0.500 mm, the root mean square spot radius is equal to 4.277 μm and geometrical spot radius is equal to 12.584 μm as image height is equal to 1.000 mm, the root mean square spot radius is equal to 3.334 μm and geometrical spot radius is equal to 8.981 μm as image height is equal to 1.500 mm, and the root mean square spot radius is equal to 7.904 μm and geometrical spot radius is equal to 25.197 μm as image height is equal to 2.000 mm for the lens assembly 1 of the first embodiment. It is obvious that the field curvature and the distortion of the lens assembly 1 of the first embodiment can be corrected effectively. Therefore, the lens assembly 1 of the first embodiment is capable of good optical performance.

Figure 5:
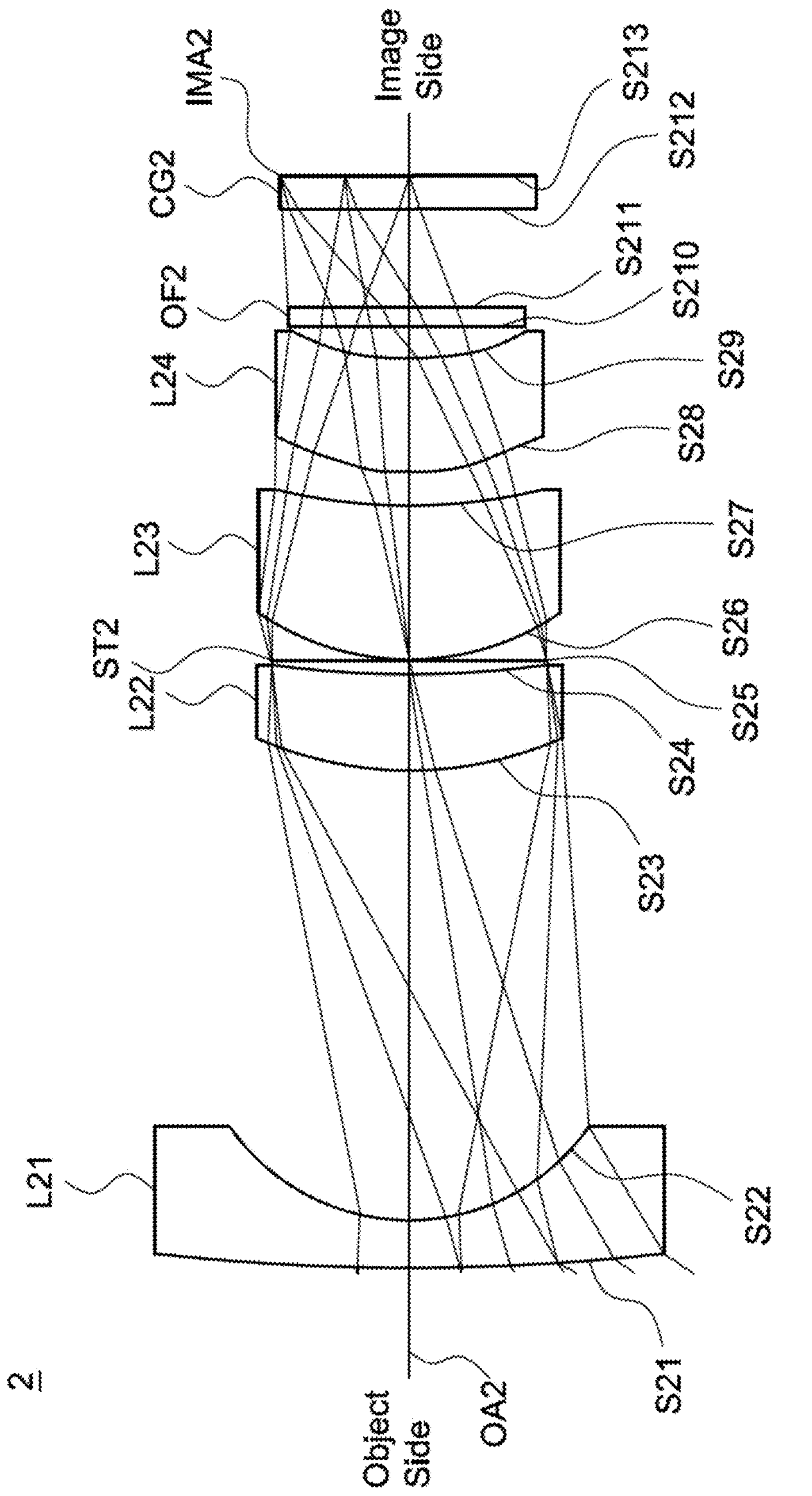
FIG. 5 is a lens layout and optical path diagram of a lens assembly in accordance with a second embodiment of the invention.

A detailed description of a lens assembly in accordance with a second embodiment of the invention is as follows. Referring to FIG. 5, the lens assembly 2 includes a first lens L21, a second lens L22, a stop ST2, a third lens L23, a fourth lens L24, an optical filter OF2, and a cover glass CG2, all of which are arranged in order from an object side to an image side along an optical axis OA2. In operation, the light from the object side is imaged on an image plane IMA2.

According to the foregoing, wherein: the third lens L23 is a meniscus lens, wherein the image side surface S27 is a concave surface; both of object side surface S210 and image side surface S211 of the optical filter OF2 are plane surfaces; and both of the object side surface S212 and image side surface S213 of the cover glass CG2 are plane surfaces.

With the above design of the lenses, stop ST2, and at least one of the conditions (1)-(6) satisfied, the lens assembly 2 can have an effective shortened total lens length, an effective increased resolution, and an effective corrected aberration.

Table 4 shows the optical specification of the lens assembly 2 in FIG. 5.

TABLE 4

Effective Focal Length = 2.09 mm F-number = 1.20
Total Lens Length = 16.98 mm Field of View = 114.40 degrees

| Surface Number | Radius of Curvature (mm) | Thickness (mm) | Nd | Vd | Effective Focal Length (mm) | Remark |
|---|---|---|---|---|---|---|
| S21 | 37.08 | 0.73 | 1.9 | 31.32 | −4.281 | L21 |
| S22 | 3.38 | 6.99 | | | | |
| S23 | 5.49 | 1.54 | 1.65 | 33.84 | 11.934 | L22 |
| S24 | 18.18 | 0.19 | | | | |
| S25 | ∞ | 0.00 | | | | ST2 |
| S26 | 3.97 | 2.41 | 1.62 | 60.34 | 10.181 | L23 |
| S27 | 8.49 | 0.51 | | | | |
| S28 | 3.11 | 1.79 | 1.66 | 20.38 | 8.538 | L24 |
| S29 | 5.64 | 0.48 | | | | |
| S210 | ∞ | 0.30 | 1.52 | 64.17 | | OF2 |
| S211 | ∞ | 1.53 | | | | |
| S212 | ∞ | 0.50 | 1.52 | 64.17 | | CG2 |
| S213 | ∞ | 0.01 | | | | |

In the second embodiment, the conic constant k and the aspheric coefficients A, B, C, D, E, F, G of each aspheric lens are shown in Table 5.

TABLE 5

| Surface Number | k | A | B | C | D | E | F | G |
|---|---|---|---|---|---|---|---|---|
| S28 | −0.3285 | −0.0026 | −0.0031 | 0.0027 | −0.0017 | 0.0005 | −8.8E−05 | 5.97E−06 |
| S29 | −23.3641 | 0.0335 | −0.0119 | 0.0083 | −0.0049 | 0.0018 | −0.0004 | 3.08E−05 |

Table 6 shows the parameters and condition values for conditions (1)-(6) in accordance with the second embodiment of the invention. It can be seen from Table 6 that the lens assembly 2 of the second embodiment satisfies the conditions (1)-(6).

TABLE 6

| AAG | 7.69 mm | BFL | 2.82 mm | T1 | 6.99 mm |
|---|---|---|---|---|---|
| TTL/BFL | 6.02 | f3/f | 4.87 | f4/f | 4.09 |
| TTL/T1 | 2.43 | f/AAG | 0.27 | f/BFL | 0.74 |

Figure 6:
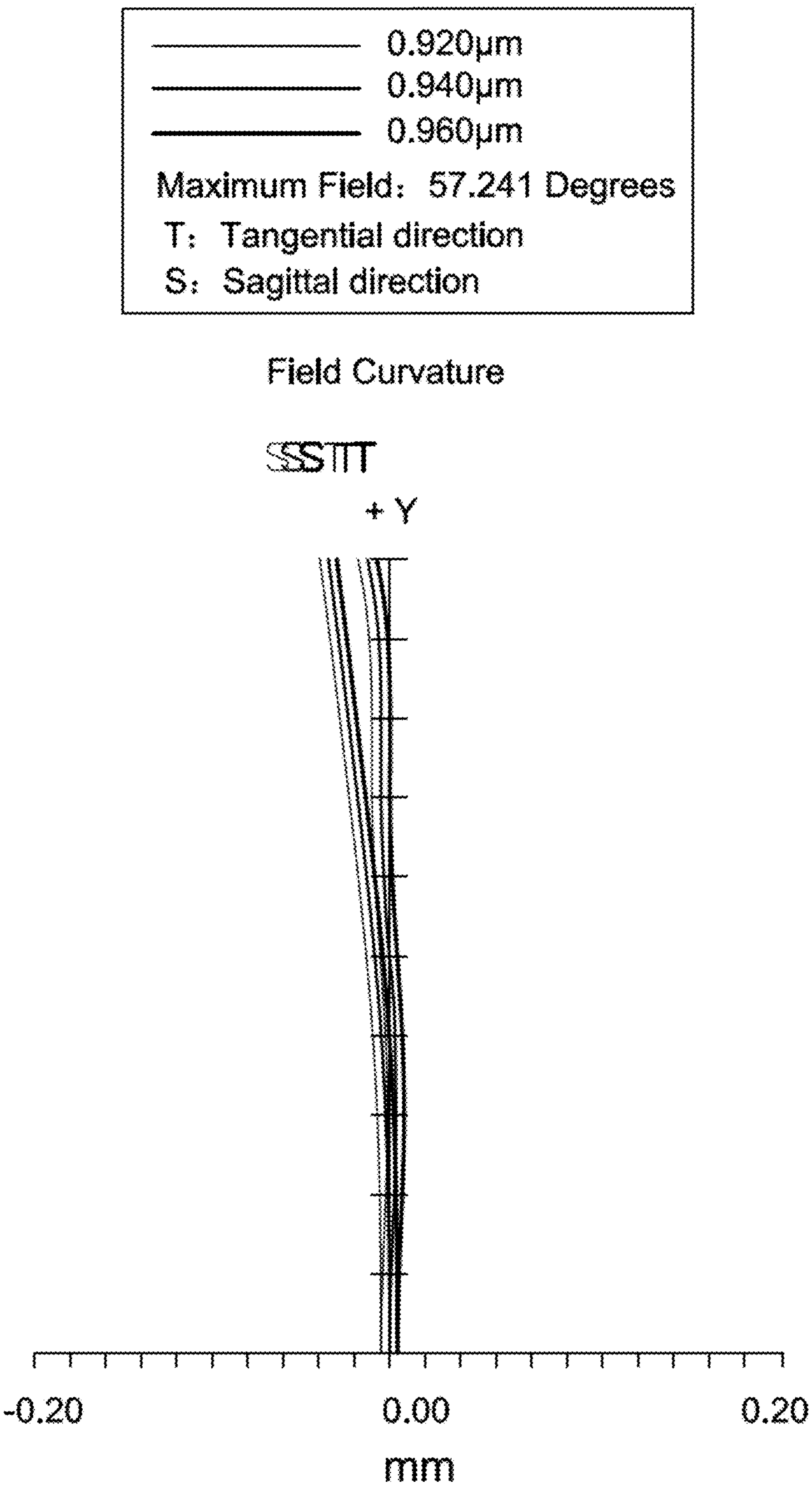
FIGS. 6, 7, and 8 depict a field curvature diagram, a distortion diagram, and a spot diagram of the lens assembly in accordance with the second embodiment of the invention, respectively.
Figure 7:
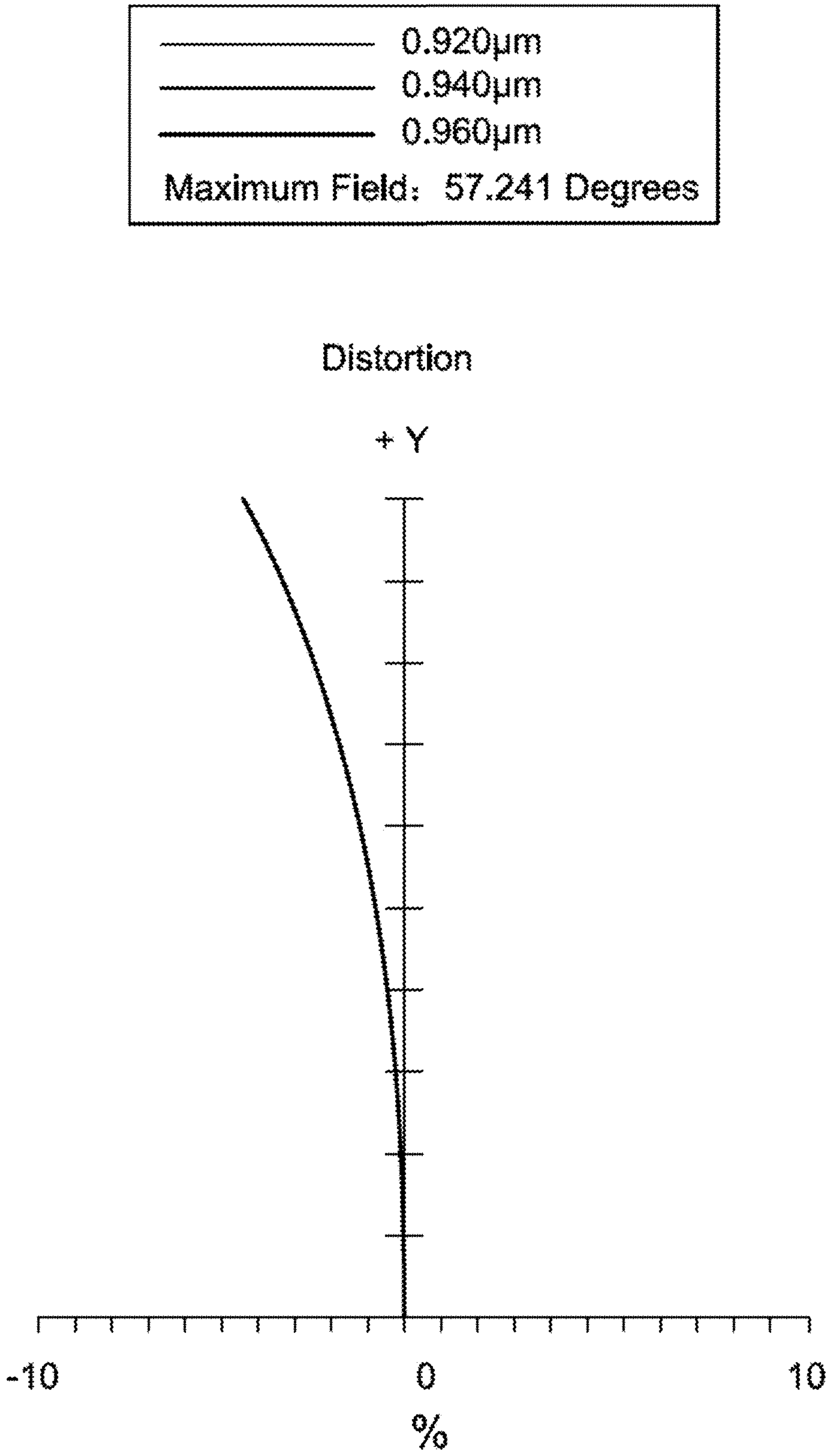
Figure 8:
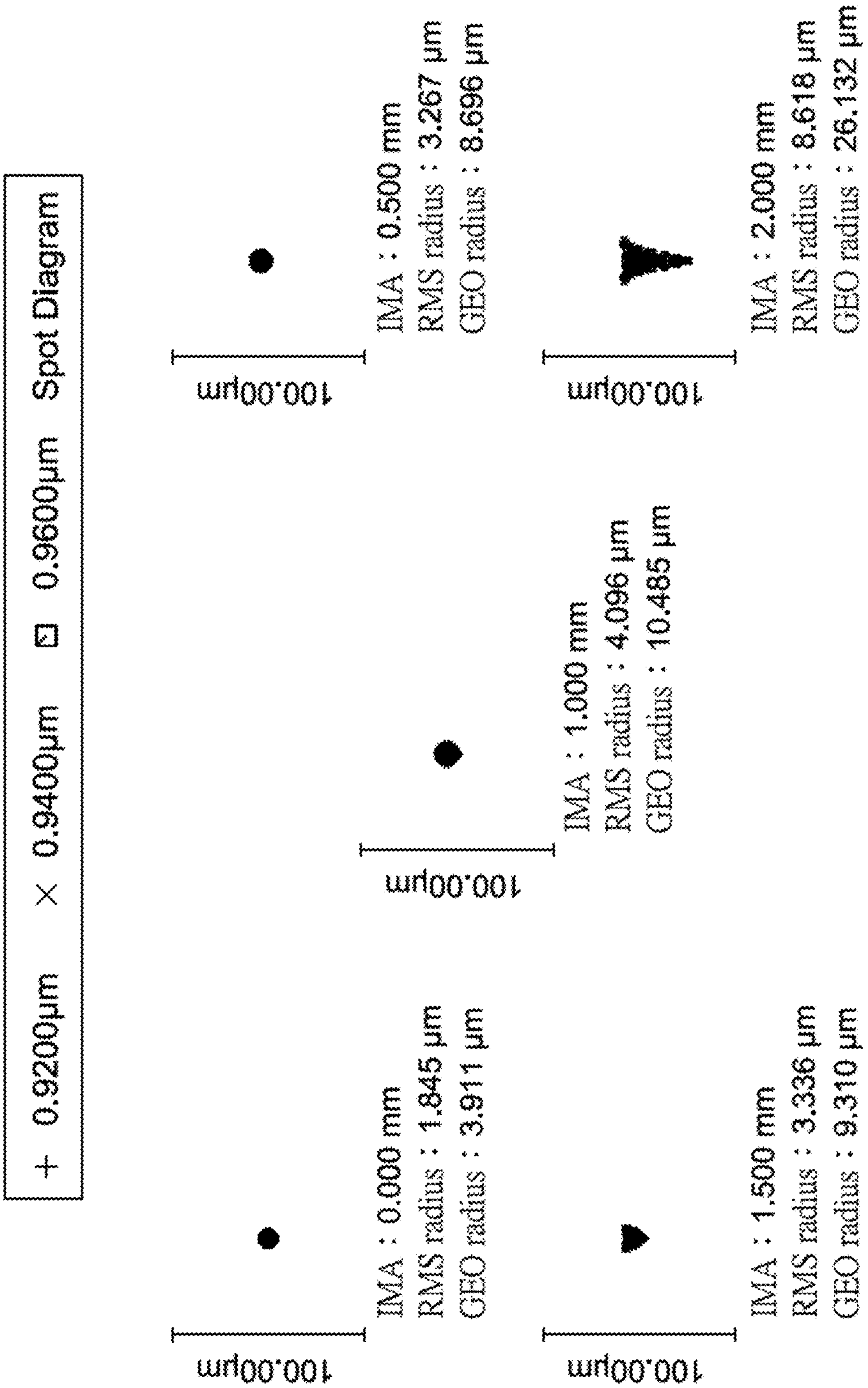

In addition, the lens assembly 2 of the second embodiment can meet the requirements of optical performance as seen in FIGS. 6-8. It can be seen from FIG. 6 that the field curvature of tangential direction and sagittal direction in the lens assembly 2 of the second embodiment ranges from −0.04 mm to 0.01 mm. It can be seen from FIG. 7 that the distortion in the lens assembly 2 of the second embodiment ranges from −5% to 0%. It can be seen from FIG. 8 that the root mean square spot radius is equal to 1.845 μm and geometrical spot radius is equal to 3.911 μm as image height is equal to 0.000 mm, the root mean square spot radius is equal to 3.267 μm and geometrical spot radius is equal to 8.696 μm as image height is equal to 0.500 mm, the root mean square spot radius is equal to 4.096 μm and geometrical spot radius is equal to 10.485 μm as image height is equal to 1.000 mm, the root mean square spot radius is equal to 3.336 μm and geometrical spot radius is equal to 9.310 μm as image height is equal to 1.500 mm, and the root mean square spot radius is equal to 8.618 μm and geometrical spot radius is equal to 26.132 μm as image height is equal to 2.000 mm for the lens assembly 2 of the second embodiment. It is obvious that the field curvature and the distortion of the lens assembly 2 of the second embodiment can be corrected effectively. Therefore, the lens assembly 2 of the second embodiment is capable of good optical performance.

Figure 9:
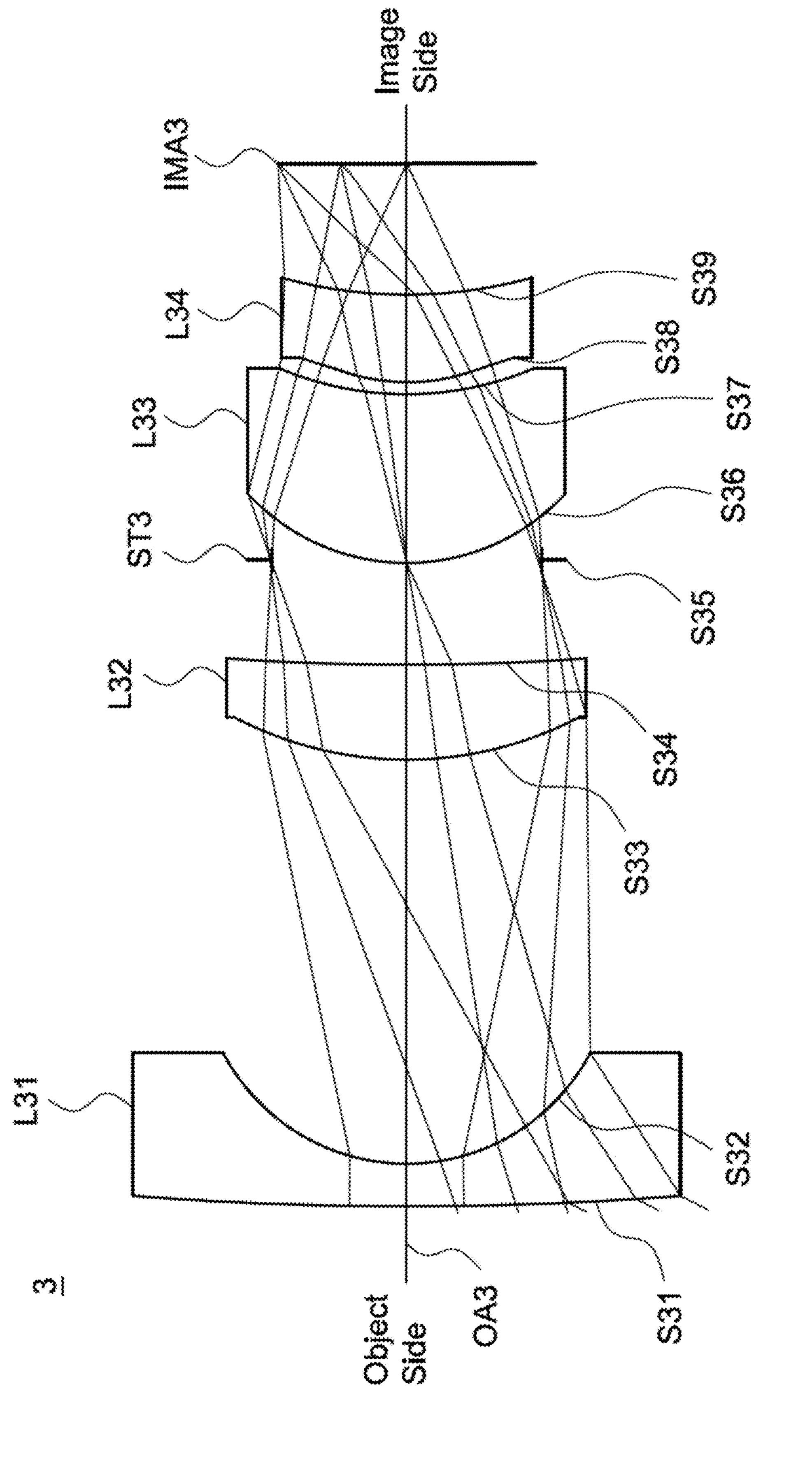
FIG. 9 is a lens layout and optical path diagram of a lens assembly in accordance with a third embodiment of the invention.

A detailed description of a lens assembly in accordance with a third embodiment of the invention is as follows. Referring to FIG. 9, the lens assembly 3 includes a first lens L31, a second lens L32, a stop ST3, a third lens L33, and a fourth lens L34, all of which are arranged in order from an object side to an image side along an optical axis OA3. In operation, the light from the object side is imaged on an image plane IMA3.

According to the foregoing, wherein: the third lens L33 is a meniscus lens, wherein the image side surface S37 is a concave surface.

With the above design of the lenses, stop ST3, and at least one of the conditions (1)-(6) satisfied, the lens assembly 3 can have an effective shortened total lens length, an effective increased resolution, and an effective corrected aberration.

Table 7 shows the optical specification of the lens assembly 3 in FIG. 9.

TABLE 7

| Effective Focal Length = 2.13 mm F-number = 1.20 Total Lens Length = 16.57 mm Field of View = 116.60 degrees | | | | | | |
|---|---|---|---|---|---|---|
| Surface Number | Radius of Curvature (mm) | Thickness (mm) | Nd | Vd | Effective Focal Length (mm) | Remark |
| S31 | 46.05 | 0.66 | 1.76 | 52.32 | −4.72 | L31 |
| S32 | 3.23 | 6.42 | | | | |
| S33 | 6.15 | 1.56 | 1.72 | 29.5 | 9.9914 | L32 |
| S34 | 51.04 | 1.62 | | | | |
| S35 | ∞ | −0.05 | | | | ST3 |
| S36 | 3.30 | 2.68 | 1.62 | 60.34 | 9.665 | L33 |
| S37 | 5.19 | 0.20 | | | | |
| S38 | 2.89 | 1.35 | 1.66 | 20.38 | 8.152 | L34 |
| S39 | 5.37 | 2.13 | | | | |

In the third embodiment, the conic constant k and the aspheric coefficients A, B, C, D, E, F, G of each aspheric lens are shown in Table 8.

TABLE 8

| Surface Number | k | A | B | C | D | E | F | G |
|---|---|---|---|---|---|---|---|---|
| S38 | 0.6967 | −0.0188 | 0.0054 | −0.0084 | 0.0047 | −0.0016 | 0.0003 | −1.6E−05 |
| S39 | −0.3735 | 0.009 | −0.0056 | 0.0027 | −0.0015 | 0.0004 | −4.7E−05 | 2.42E−06 |

Table 9 shows the parameters and condition values for conditions (1)-(6) in accordance with the third embodiment of the invention. It can be seen from Table 9 that the lens assembly 3 of the third embodiment satisfies the conditions (1)-(6).

TABLE 9

| AAG | 8.19 mm | BFL | 2.13 mm | T1 | 6.42 mm |
|---|---|---|---|---|---|
| TTL/BFL | 7.78 | f3/f | 4.54 | f4/f | 3.83 |
| TTL/T1 | 2.58 | f/AAG | 0.26 | f/BFL | 1.00 |

Figure 10:
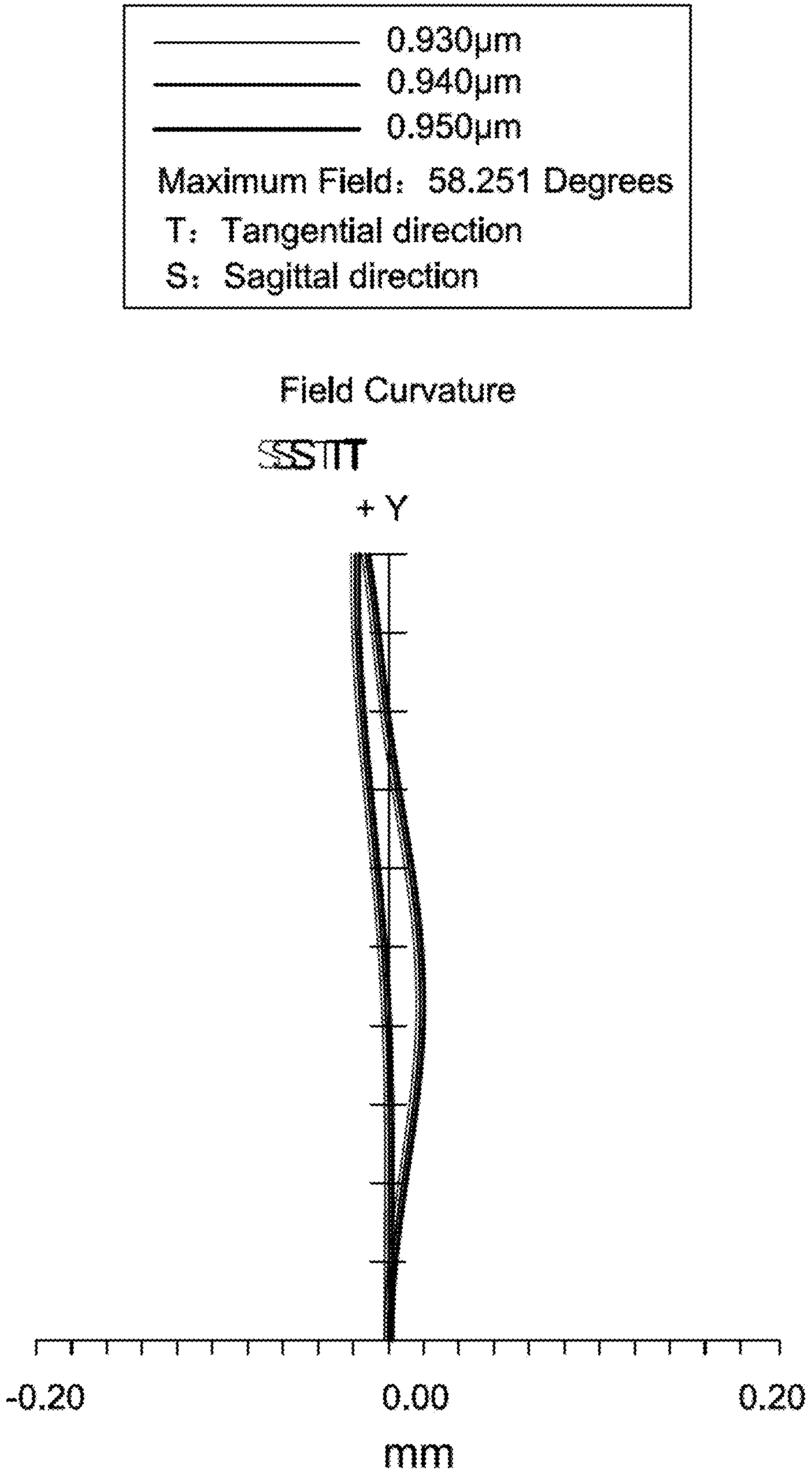
FIGS. 10, 11, and 12 depict a field curvature diagram, a distortion diagram, and a spot diagram of the lens assembly in accordance with the third embodiment of the invention, respectively.
Figure 11:
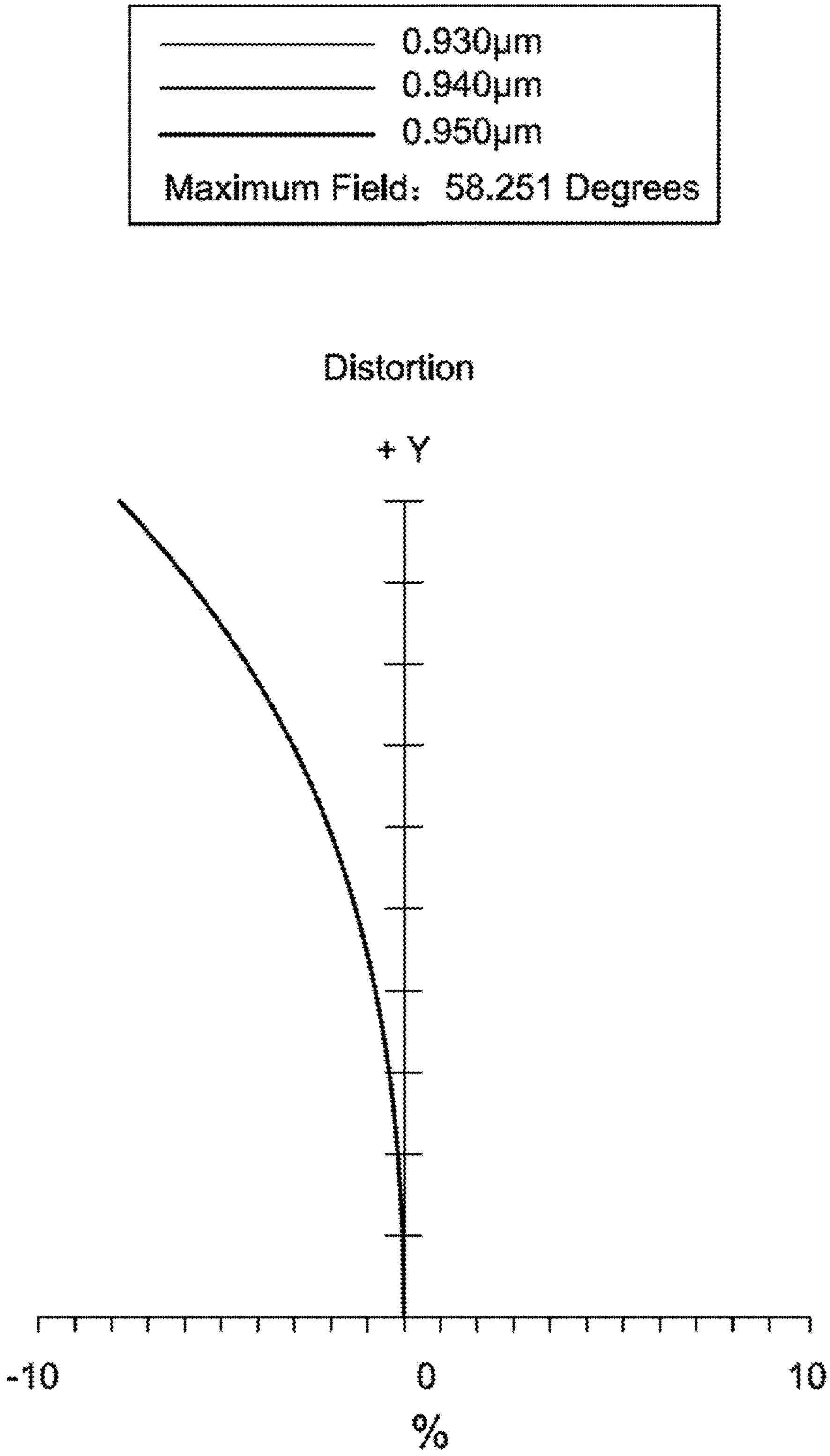
Figure 12:
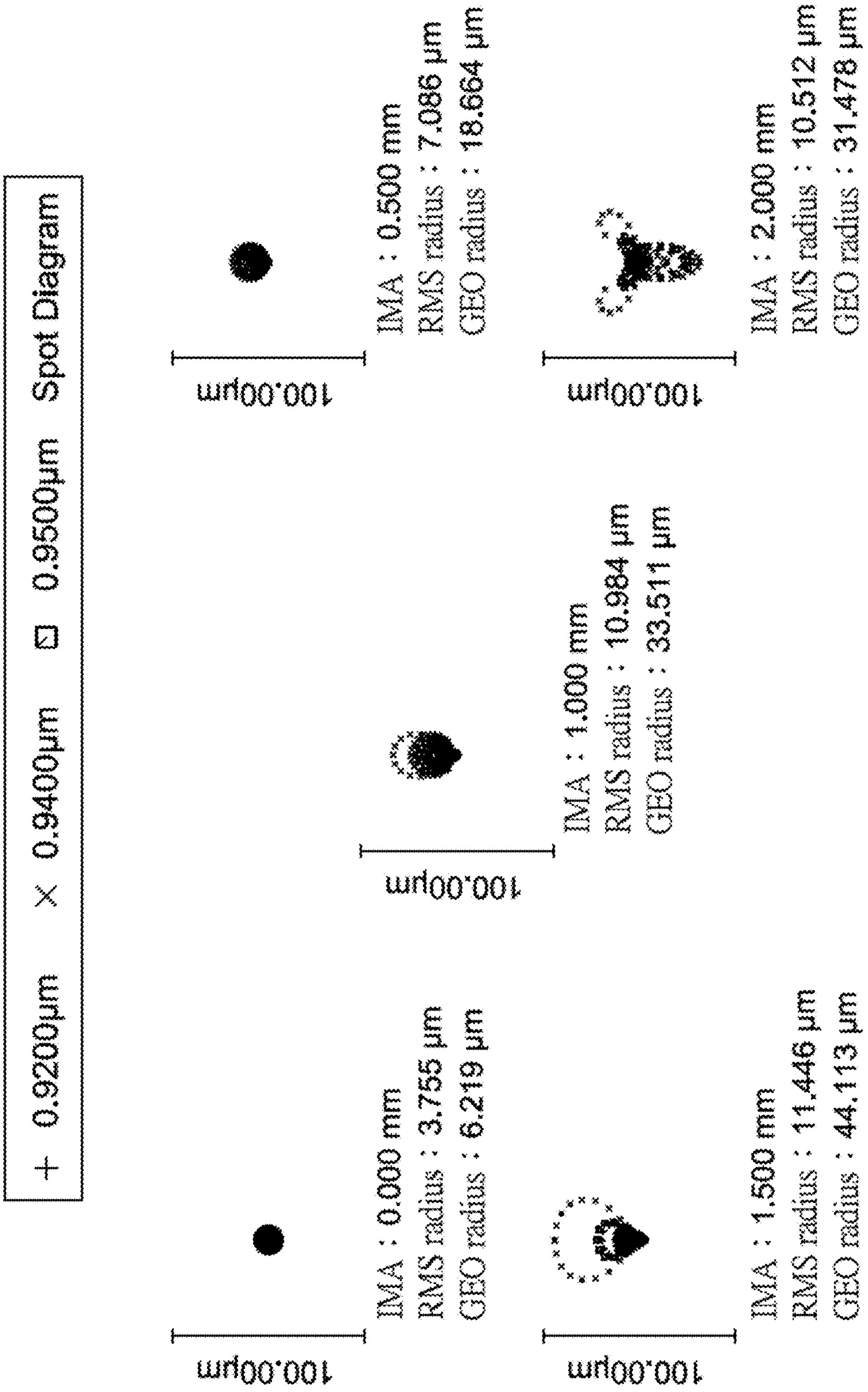

In addition, the lens assembly 3 of the third embodiment can meet the requirements of optical performance as seen in FIGS. 10-12. It can be seen from FIG. 10 that the field curvature of tangential direction and sagittal direction in the lens assembly 3 of the third embodiment ranges from −0.02 mm to 0.02 mm. It can be seen from FIG. 11 that the distortion in the lens assembly 3 of the third embodiment ranges from −8% to 0%. It can be seen from FIG. 12 that the root mean square spot radius is equal to 3.755 μm and geometrical spot radius is equal to 6.219 μm as image height is equal to 0.000 mm, the root mean square spot radius is equal to 7.086 μm and geometrical spot radius is equal to 18.664 m as image height is equal to 0.500 mm, the root mean square spot radius is equal to 10.984 μm and geometrical spot radius is equal to 33.511 μm as image height is equal to 1.000 mm, the root mean square spot radius is equal to 11.446 μm and geometrical spot radius is equal to 44.113 μm as image height is equal to 1.500 mm, and the root mean square spot radius is equal to 10.512 μm and geometrical spot radius is equal to 31.478 m as image height is equal to 2.000 mm for the lens assembly 3 of the third embodiment. It is obvious that the field curvature and the distortion of the lens assembly 3 of the third embodiment can be corrected effectively. Therefore, the lens assembly 3 of the third embodiment is capable of good optical performance.

Figure 13:
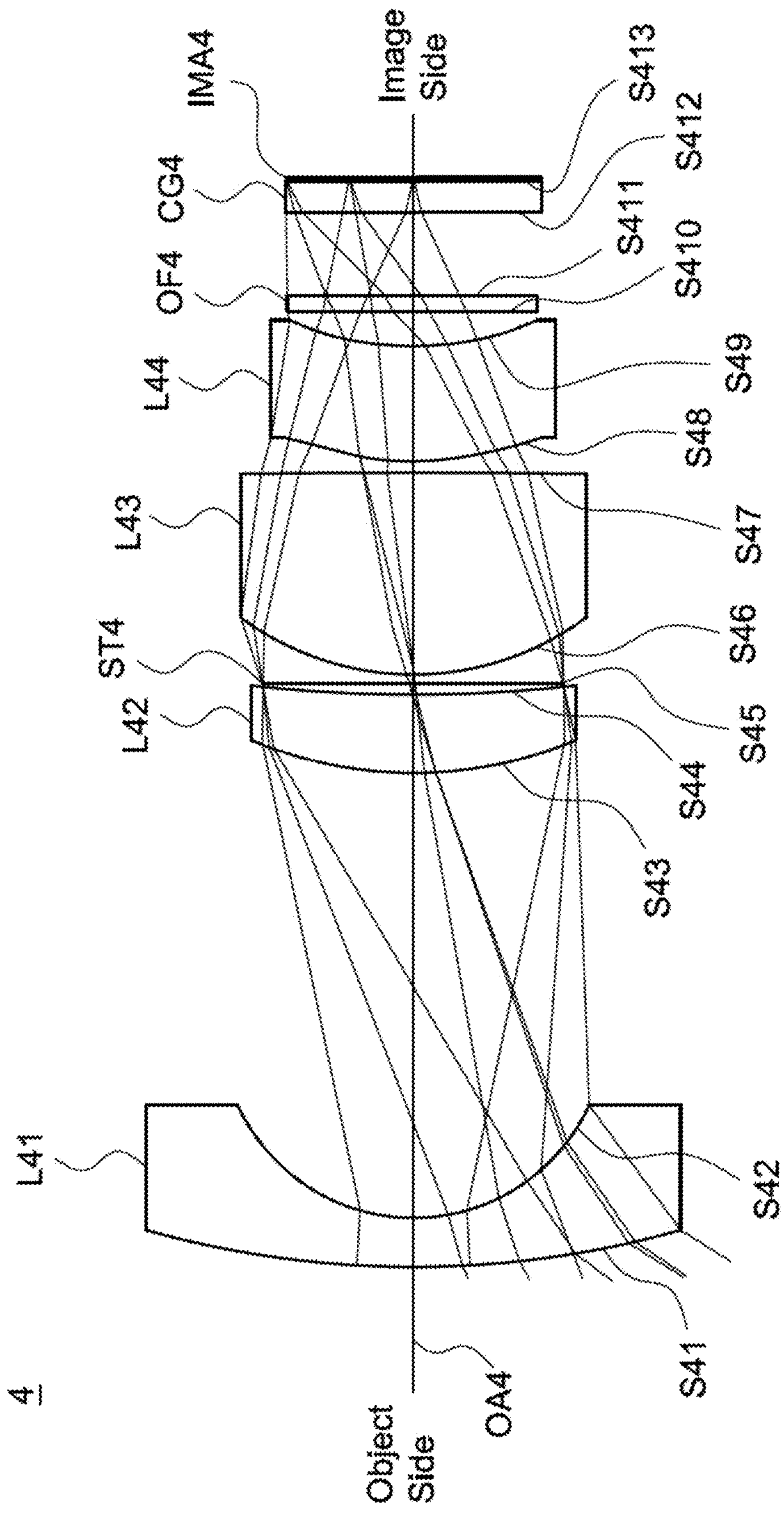
FIGS. 13, 14, and 15 are a lens layout and optical path diagram of a lens assembly in accordance with a fourth, fifth, and sixth embodiments of the invention, respectively.

A detailed description of a lens assembly in accordance with a fourth embodiment of the invention is as follows. Referring to FIG. 13, the lens assembly 4 includes a first lens L41, a second lens L42, a stop ST4, a third lens L43, a fourth lens L44, an optical filter OF4, and a cover glass CG4, all of which are arranged in order from an object side to an image side along an optical axis OA4. In operation, the light from the object side is imaged on an image plane IMA4.

According to the foregoing, wherein: the third lens L43 is a biconvex lens, wherein the image side surface S47 is a convex surface; both of object side surface S410 and image side surface S411 of the optical filter OF4 are plane surfaces; and both of the object side surface S412 and image side surface S413 of the cover glass CG4 are plane surfaces.

With the above design of the lenses, stop ST4, and at least one of the conditions (1)-(6) satisfied, the lens assembly 4 can have an effective shortened total lens length, an effective increased resolution, and an effective corrected aberration.

Table 10 shows the optical specification of the lens assembly 4 in FIG. 13.

TABLE 10

| Effective Focal Length = 2.06 mm F-number = 1.20 Total Lens Length = 17.00 mm Field of View = 114.00 degrees | | | | | | |
|---|---|---|---|---|---|---|
| Surface Number | Radius of Curvature (mm) | Thickness (mm) | Nd | Vd | Effective Focal Length (mm) | Remark |
| S41 | 15.00 | 0.78 | 1.9 | 31.32 | −4.49 | L41 |
| S42 | 3.05 | 6.97 | | | | |
| S43 | 6.37 | 1.21 | 1.65 | 33.84 | 13.27 | L42 |
| S44 | 24.85 | 0.15 | | | | |
| S45 | ∞ | 0.16 | | | | ST4 |
| S46 | 4.24 | 3.18 | 1.62 | 60.34 | 6.71 | L43 |
| S47 | −84.96 | 0.15 | | | | |
| S48 | 3.97 | 1.80 | 1.66 | 20.38 | 18.58 | L44 |
| S49 | 4.93 | 0.50 | | | | |
| S410 | ∞ | 0.30 | 1.52 | 64.17 | | OF4 |
| S411 | ∞ | 1.30 | | | | |
| S412 | ∞ | 0.50 | 1.52 | 64.17 | | CG4 |
| S413 | ∞ | 0.00 | | | | |

In the fourth embodiment, the conic constant k and the aspheric coefficients A, B, C, D, E, F, G of each aspheric lens are shown in Table 11.

TABLE 11

| Surface Number | k | A | B | C | D | E | F | G |
|---|---|---|---|---|---|---|---|---|
| S48 | −0.1882 | −0.0044 | −0.0031 | 0.002 | −0.001 | 0.0002 | −3.2E−05 | 1.77E−06 |
| S49 | −9.9453 | 0.0225 | −0.0135 | 0.0102 | −0.0055 | 0.0017 | −0.0003 | 2.04E−05 |

Table 12 shows the parameters and condition values for conditions (1)-(6) in accordance with the fourth embodiment of the invention. It can be seen from Table 12 that the lens assembly 4 of the fourth embodiment satisfies the conditions (1)-(6).

TABLE 12

| AAG | 7.43 mm | BFL | 2.60 mm | T1 | 6.97 mm |
|---|---|---|---|---|---|
| TTL/BFL | 6.54 | f3/f | 3.26 | f4/f | 9.02 |
| TTL/T1 | 2.44 | f/AAG | 0.28 | f/BFL | 0.79 |

Figure 14:
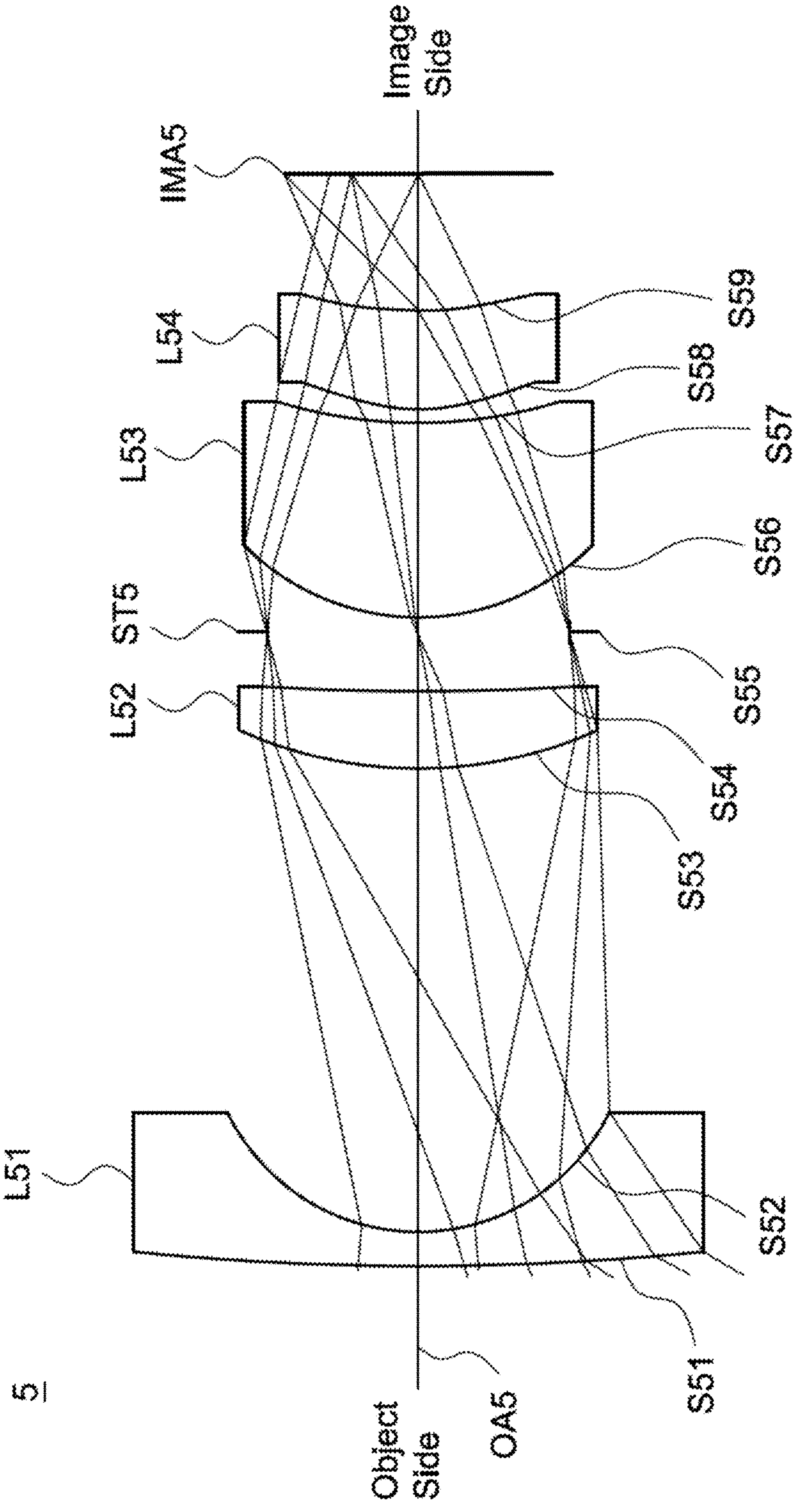

A detailed description of a lens assembly in accordance with a fifth embodiment of the invention is as follows. Referring to FIG. 14, the lens assembly 5 includes a first lens L51, a second lens L52, a stop ST5, a third lens L53, and a fourth lens L54, all of which are arranged in order from an object side to an image side along an optical axis OA5. In operation, the light from the object side is imaged on an image plane IMA5.

According to the foregoing, wherein: the third lens L53 is a meniscus lens, wherein the image side surface S57 is a concave surface.

With the above design of the lenses, stop ST5, and at least one of the conditions (1)-(6) satisfied, the lens assembly 5 can have an effective shortened total lens length, an effective increased resolution, and an effective corrected aberration.

Table 13 shows the optical specification of the lens assembly 5 in FIG. 14.

TABLE 13

Effective Focal Length = 2.10 mm F-number = 1.20
Total Lens Length = 16.39 mm Field of View = 120.60 degrees

| Surface Number | Radius of Curvature (mm) | Thickness (mm) | Nd | Vd | Effective Focal Length (mm) | Remark |
|---|---|---|---|---|---|---|
| S51 | 50.00 | 0.46 | 1.74 | 28.3 | −4.727 | L51 |
| S52 | 3.16 | 6.97 | | | | |
| S53 | 6.02 | 1.19 | 1.72 | 29.5 | 9.921 | L52 |
| S54 | 43.54 | 0.87 | | | | |
| S55 | ∞ | 0.24 | | | | ST5 |
| S56 | 3.60 | 2.91 | 1.62 | 60.34 | 9.38 | L53 |
| S57 | 6.71 | 0.22 | | | | |
| S58 | 2.90 | 1.48 | 1.54 | 56.12 | 10.018 | L54 |
| S59 | 5.29 | 2.05 | | | | |

In the fifth embodiment, the conic constant k and the aspheric coefficients A, B, C, D, E, F, G of each aspheric lens are shown in Table 14.

TABLE 14

| Surface Number | k | A | B | C | D | E | F | G |
|---|---|---|---|---|---|---|---|---|
| S58 | 0.9026 | −0.0246 | 0.0143 | −0.0216 | 0.0141 | −0.0051 | 0.0009 | −7.1E−05 |
| S59 | −1.0856 | 0.0066 | −0.0051 | 0.0057 | −0.0054 | 0.0022 | −0.0004 | 3.48E−05 |

Table 15 shows the parameters and condition values for conditions (1)-(6) in accordance with the fifth embodiment of the invention. It can be seen from Table 15 that the lens assembly 5 of the fifth embodiment satisfies the conditions (1)-(6).

TABLE 15

| AAG | 8.30 mm | BFL | 2.05 mm | T1 | 6.97 mm |
|---|---|---|---|---|---|
| TTL/BFL | 8.00 | f3/f | 4.47 | f4/f | 4.77 |
| TTL/T1 | 2.35 | f/AAG | 0.25 | f/BFL | 1.02 |

Figure 15:
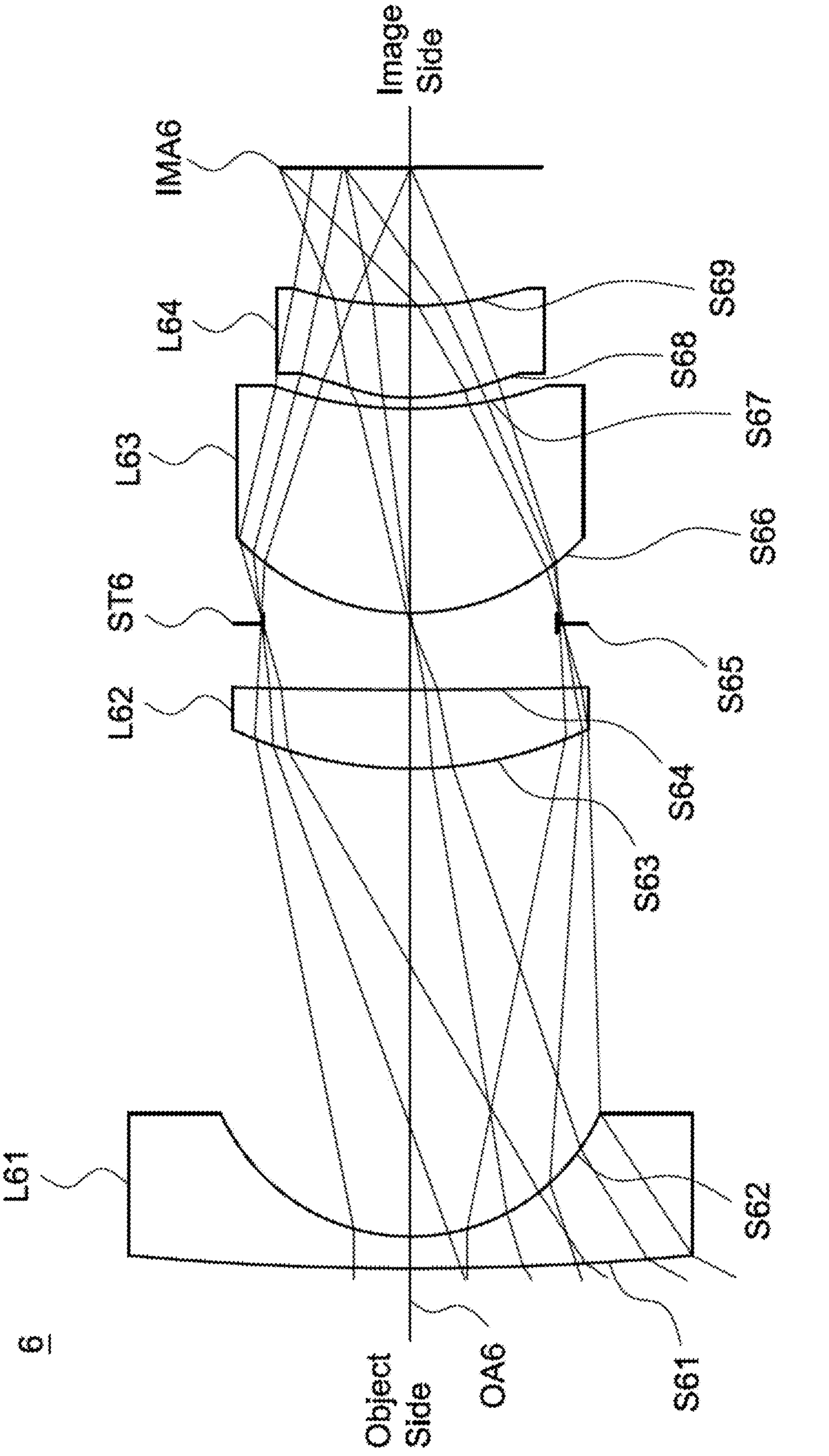

A detailed description of a lens assembly in accordance with a sixth embodiment of the invention is as follows. Referring to FIG. 15, the lens assembly 6 includes a first lens L61, a second lens L62, a stop ST6, a third lens L63, and a fourth lens L64, all of which are arranged in order from an object side to an image side along an optical axis OA6. In operation, the light from the object side is imaged on an image plane IMA6.

According to the foregoing, wherein: the third lens L63 is a meniscus lens, wherein the image side surface S67 is a concave surface.

With the above design of the lenses, stop ST6, and at least one of the conditions (1)-(6) satisfied, the lens assembly 6 can have an effective shortened total lens length, an effective increased resolution, and an effective corrected aberration.

Table 16 shows the optical specification of the lens assembly 6 in FIG. 15.

TABLE 16

Effective Focal Length = 2.11 mm F-number = 1.20
Total Lens Length = 16.58 mm Field of View = 120.40 degrees

| Surface Number | Radius of Curvature (mm) | Thickness (mm) | Nd | Vd | Effective Focal Length (mm) | Remark |
|---|---|---|---|---|---|---|
| S61 | 50.00 | 0.47 | 1.74 | 28.3 | −4.759 | L61 |
| S62 | 3.18 | 7.04 | | | | |
| S63 | 6.23 | 1.20 | 1.72 | 29.5 | 9.997 | L62 |
| S64 | 54.75 | 0.99 | | | | |
| S65 | ∞ | 0.21 | | | | ST6 |
| S66 | 3.60 | 3.04 | 1.62 | 60.34 | 9.21 | L63 |
| S67 | 6.83 | 0.17 | | | | |
| S68 | 2.86 | 1.37 | 1.54 | 56.12 | 10.319 | L64 |
| S69 | 5.04 | 2.09 | | | | |

In the sixth embodiment, the conic constant k and the aspheric coefficients A, B, C, D, E, F, G of each aspheric lens are shown in Table 17.

TABLE 17

| Surface Number | k | A | B | C | D | E | F | G |
|---|---|---|---|---|---|---|---|---|
| S68 | 0.8602 | −0.0246 | 0.0144 | −0.0217 | 0.014 | −0.0051 | 0.0009 | −7.1E−05 |
| S69 | −0.7274 | 0.0071 | −0.0058 | 0.006 | −0.0054 | 0.0022 | −0.0004 | 3.37E−05 |

Table 18 shows the parameters and condition values for conditions (1)-(6) in accordance with the sixth embodiment of the invention. It can be seen from Table 18 that the lens assembly 6 of the sixth embodiment satisfies the conditions (1)-(6).

TABLE 18

| AAG | 8.41 mm | BFL | 2.09 mm | T1 | 7.04 mm |
|---|---|---|---|---|---|
| TTL/BFL | 7.93 | f3/f | 4.36 | f4/f | 4.89 |
| TTL/T1 | 2.36 | f/AAG | 0.25 | f/BFL | 1.01 |

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:

a first lens with negative refractive power;

a second lens with positive refractive power;

a third lens with refractive power; and a fourth lens with refractive power;

wherein the first lens, the second lens, the third lens, and the fourth lens are arranged in order from an object side to an image side along an optical axis;

wherein the lens assembly satisfies at least one of the following conditions:

$$3 \le f3/f \le 5.5;$$

$$2.3 \le TTL/T1 \le 2.65;$$

wherein f is an effective focal length of the lens assembly, f3 is an effective focal length of the third lens, TTL is an interval from an object side surface of the first lens to an image plane along the optical axis, and T1 is an interval from an image side surface of the first lens to an object side surface of the second lens along the optical axis.

2. The lens assembly as claimed in claim 1, wherein the third lens is with positive refractive power.

3. The lens assembly as claimed in claim 2, wherein the third lens comprises a convex surface facing the object side.

4. The lens assembly as claimed in claim 3, wherein the third lens comprises a convex surface facing the image side.

5. The lens assembly as claimed in claim 4, wherein the lens assembly satisfies at least one of the following conditions:

$$3 \le f4/f \le 9.5;$$

$$5.5 \le TTL/BFL \le 8.5;$$

$$0.2 \le f/AAG \le 0.3;$$

$$0.72 \le f/BFL \le 1.04;$$

wherein f is the effective focal length of the lens assembly, f4 is an effective focal length of the fourth lens, TTL is the interval from the object side surface of the first lens to the image plane along the optical axis, BFL is an interval from an image side surface of the fourth lens to the image plane along the optical axis, and AAG is a sum of all air intervals from the image side surface of the first lens to an object side surface of the fourth lens along the optical axis.

6. The lens assembly as claimed in claim 3, wherein the third lens comprises a concave surface facing the image side.

7. The lens assembly as claimed in claim 6, wherein the lens assembly satisfies at least one of the following conditions:

$$3 \le f4/f \le 9.5;$$

$$5.5 \le TTL/BFL \le 8.5;$$

$$0.2 \le f/AAG \le 0.3;$$

$$0.72 \le f/BFL \le 1.04;$$

wherein f is the effective focal length of the lens assembly, f4 is an effective focal length of the fourth lens, TTL is the interval from the object side surface of the first lens to the image plane along the optical axis, BFL is an interval from the image side surface of the fourth lens to the image plane along the optical axis, and AAG is a sum of all air intervals from the image side surface of the first lens to an object side surface of the fourth lens along the optical axis.

8. The lens assembly as claimed in claim 1, wherein the first lens is a spherical glass lens, the second lens is a spherical glass lens, the third lens is a spherical glass lens, or the fourth lens is an aspheric plastic lens.

9. The lens assembly as claimed in claim 8, wherein the lens assembly satisfies at least one of the following conditions:

$$3 \le f4/f \le 9.5;$$

$$5.5 \le TTL/BFL \le 8.5;$$

-continued $$0.2 \le f/AAG \le 0.3;$$

$$0.72 \le f/BFL \le 1.04;$$

wherein f is the effective focal length of the lens assembly, f4 is an effective focal length of the fourth lens, TTL is the interval from the object side surface of the first lens to the image plane along the optical axis, BFL is an interval from an image side surface of the fourth lens to the image plane along the optical axis, and AAG is a sum of all air intervals from the image side surface of the first lens to an object side surface of the fourth lens along the optical axis.

10. The lens assembly as claimed in claim 9, further comprising a stop disposed between the second lens and the third lens, wherein:

the first lens is a meniscus lens and comprises a convex surface facing the object side and a concave surface facing the image side;

the second lens is a meniscus lens and comprises a convex surface facing the object side and a concave surface facing the image side;

the third lens is a biconvex lens with positive refractive power and comprises a convex surface facing the object side and another convex surface facing the image side; and the fourth lens is a meniscus lens with positive refractive power and comprises a convex surface facing the object side and a concave surface facing the image side.

11. The lens assembly as claimed in claim 9, further comprising a stop disposed between the second lens and the third lens, wherein:

the first lens is a meniscus lens and comprises a convex surface facing the object side and a concave surface facing the image side;

the second lens is a meniscus lens and comprises a convex surface facing the object side and a concave surface facing the image side;

the third lens is a meniscus lens with positive refractive power and comprises a convex surface facing the object side and a concave surface facing the image side; and the fourth lens is a meniscus lens with positive refractive power and comprises a convex surface facing the object side and a concave surface facing the image side.

12. The lens assembly as claimed in claim 1, wherein the fourth lens is with positive refractive power.

13. The lens assembly as claimed in claim 12, wherein the fourth lens is a meniscus lens and comprises a convex surface facing the object side and a concave surface facing the image side.

14. The lens assembly as claimed in claim 13, wherein the lens assembly satisfies at least one of the following conditions:

$$3 \le f4/f \le 9.5;$$

$$5.5 \le TTL/BFL \le 8.5;$$

$$0.2 \le f/AAG \le 0.3;$$

$$0.72 \le f/BFL \le 1.04;$$

wherein f is the effective focal length of the lens assembly, f4 is an effective focal length of the fourth lens, TTL is the interval from the object side surface of the first lens to the image plane along the optical axis, BFL is an interval from an image side surface of the fourth lens to the image plane along the optical axis, and AAG is a sum of all air intervals from the image side surface of the first lens to an object side surface of the fourth lens along the optical axis.

15. The lens assembly as claimed in claim 1, wherein:

the first lens is a meniscus lens and comprises a convex surface facing the object side and a concave surface facing the image side; and the second lens is a meniscus lens and comprises a convex surface facing the object side and a concave surface facing the image side.

16. The lens assembly as claimed in claim 15, wherein the lens assembly satisfies at least one of the following conditions:

$$3 \le f4/f \le 9.5;$$

$$5.5 \le TTL/BFL \le 8.5;$$

$$0.2 \le f/AAG \le 0.3;$$

$$0.72 \le f/BFL \le 1.04;$$

wherein f is the effective focal length of the lens assembly, f4 is an effective focal length of the fourth lens, TTL is the interval from the object side surface of the first lens to the image plane along the optical axis, BFL is an interval from an image side surface of the fourth lens to the image plane along the optical axis, and AAG is a sum of all air intervals from the image side surface of the first lens to an object side surface of the fourth lens along the optical axis.

17. The lens assembly as claimed in claim 1, further comprising a stop disposed between the second lens and the third lens.

18. The lens assembly as claimed in claim 17, wherein the lens assembly satisfies at least one of the following conditions:

$$3 \le f4/f \le 9.5;$$

$$5.5 \le TTL/BFL \le 8.5;$$

$$0.2 \le f/AAG \le 0.3;$$

$$0.72 \le f/BFL \le 1.04;$$

wherein f is the effective focal length of the lens assembly, f4 is an effective focal length of the fourth lens, TTL is the interval from the object side surface of the first lens to the image plane along the optical axis, BFL is an interval from an image side surface of the fourth lens to the image plane along the optical axis, and AAG is a sum of all air intervals from the image side surface of the first lens to an object side surface of the fourth lens along the optical axis.

19. A lens assembly comprising:

a first lens with negative refractive power;

a second lens with positive refractive power;

a third lens with positive refractive power and comprises a convex surface facing an object side and a concave surface facing an image side; and a fourth lens with refractive power;

wherein the first lens, the second lens, the third lens, and the fourth lens are arranged in order from the object side to the image side along an optical axis;

wherein the lens assembly satisfies at least one of the following conditions:

$$3 \leq f3/f \leq 5.5;$$

$$0.2 \leq f/AAG \leq 0.3;$$

$$0.72 \leq f/BFL \leq 1.04;$$

wherein f is an effective focal length of the lens assembly, f3 is an effective focal length of the third lens, AAG is a sum of all air intervals from an image side surface of the first lens to an object side surface of the fourth lens along the optical axis, and BFL is an interval from an image side surface of the fourth lens to an image plane along the optical axis.

20. A lens assembly comprising:

a first lens with negative refractive power;

a second lens with positive refractive power;

a third lens with refractive power; and a fourth lens is a meniscus lens with positive refractive power and comprises a convex surface facing an object side and a concave surface facing an image side;

wherein the first lens, the second lens, the third lens, and the fourth lens are arranged in order from the object side to the image side along an optical axis;

wherein the lens assembly satisfies at least one of the following conditions:

$$3 \leq f3/f \leq 5.5;$$

$$0.2 \leq f/AAG \leq 0.3;$$

$$0.72 \leq f/BFL \leq 1.04;$$

wherein f is an effective focal length of the lens assembly, f3 is an effective focal length of the third lens, AAG is a sum of all air intervals from an image side surface of the first lens to an object side surface of the fourth lens along the optical axis, and BFL is an interval from an image side surface of the fourth lens to an image plane along the optical axis.

* * * * *